(12) United States Patent
Beteille et al.

(10) Patent No.: US 6,529,308 B2
(45) Date of Patent: Mar. 4, 2003

(54) ELECTROCHEMICAL DEVICE

(75) Inventors: Fabien Beteille, Paris (FR); Jean-Christophe Giron, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/025,575

(22) Filed: Dec. 26, 2001

(65) Prior Publication Data

US 2002/0054419 A1 May 9, 2002

Related U.S. Application Data

(63) Continuation of application No. 09/486,718, filed as application No. PCT/FR99/01653 on Jul. 8, 1999, now Pat. No. 6,337,758.

(30) Foreign Application Priority Data

Jul. 10, 1998 (FR) .............................. 98 08928

(51) Int. Cl.[7] .............................. G02F 1/15; G02F 1/153

(52) U.S. Cl. ........................ 359/265; 359/270; 359/268

(58) Field of Search ................................ 359/265, 270, 359/268, 275

(56) References Cited

U.S. PATENT DOCUMENTS

| 4,938,571 A | 7/1990 | Cogan ......................... 359/275 |
| 5,612,153 A | 3/1997 | Moulton et al. ............ 429/191 |

FOREIGN PATENT DOCUMENTS

JP    62-163021    7/1987

OTHER PUBLICATIONS

PCT/FR 99/01653, Jul. 1987, Vitrage et al.
EP–0363028–A3, Sep. 1989, Demitryont.
WO 95/19588, Jul. 1995, Kallman.
WO 00/03289, Jan. 2000, Beteille et al.

Primary Examiner—Georgia Epps
Assistant Examiner—Timothy Thompson
(74) Attorney, Agent, or Firm—Oblon, Spivak, McClelland, Maier & Neustadt, P.C.

(57) ABSTRACT

An electrochemical device has at least one carrier substrate (1) provided with a stack (2) of functional layers, including at least one electrochemically active layer (4), which is capable of reversibly and simultaneously inserting ions and electrons and is arranged between two electroconductive layers. The device can be of the electrochromic type. The functionality of at least one of the functional layers, with the exception of one of the electroconductive layers (3,8), is locally inhibited so as to delimit inactive peripheral or non-peripheral regions in the stack (2).

24 Claims, 1 Drawing Sheet

ELECTROCHEMICAL DEVICE

BACKGROUND OF THE INVENTION

1. Field of the Invention

The present invention relates to the field of electrochemical devices having at least one electrochemically active layer capable of reversibly and simultaneously inserting ions and electrons, in particular electrochromic devices. These electro-chemical devices are, in particular, used to manufacture windows whose optical and/or energy transmission or optical reflection can be modulated using an electric current. They can also be used to manufacture energy-storage elements such as batteries or, alternatively, gas sensors or display elements.

2. Description of the Background

Considering the particular example of electrochromic systems, it will be recalled that, as is known, they include a layer of a material capable of reversibly and simultaneously inserting ions, in particular cations, and electrons, and whose oxidation states corresponding to the inserted and deinserted states are of distinct coloration, one of the states generally being transparent. The insertion or deinsertion reaction is controlled by a suitable electrical power supply, in particular by applying an appropriate potential difference. The electrochromic material, in general based on tungsten oxide, thus needs to be brought into contact with a source of electrons, such as a transparent electroconductive layer, and a source of ions, such as an ionic-conductor electrolyte.

It is furthermore known that, in order to provide at least of the order of a hundred switching operations, a back electrode which is itself also capable of reversibly inserting cations, symmetrically with respect to the layer of electrochromic material, must be associated with the layer of electrochromic material, so that, macroscopically, the electrolyte appears as a simple ion medium.

The back electrode must be formed either by a layer which has neutral coloration, or one which is at least transparent when the electrochromic layer is in the uncoloured state. Since tungsten oxide is a cathodic electrochromic material, that is to say its coloured state corresponds to the most reduced state, an anodic electrochromic material such as nickel oxide, iridium oxide or vanadium oxide, without implying any limitation, is generally used for the back electrode. It has also been proposed to use a material which is optically neutral in the oxidation states in question, for example cerium oxide or organic materials such as electronic conducting polymers (polyaniline, etc.) or Prussian blue.

Such systems are described, for example, in European Patents EP-0,338,876, EP-0,408,427, EP-0,575,207 and EP-0,628,849.

These systems can currently be divided into two categories, according to the type of electrolyte which they use:

either the electrolyte is present in the form of a polymer or a gel, for example a protonic-conduction polymer such as those described in European Patents EP-0,253, 713 and EP-0,670,346, or a polymer with lithium-ion conduction such as those described in Patents EP-0, 382,623, EP-0,518,754 or EP-0,532,408 or the electrolyte is an inorganic layer which is an ionic conductor but electronically insulating, in which case the term "all solid" electrochromic systems is used.

Reference may be made to patents EP97/400702.3 of Mar. 27, 1997 and EP-0 831 360 for the description of an "all solid" system. It is principally to this type of system that the invention relates, because it has a clear advantage in terms of ease of manufacture. This is because, with such a configuration, all the layers of the system can be deposited successively on a single carrier substrate (whereas in the system in which the electrolyte is a polymer or a gel, it is normally necessary to manufacture two "half-cells" which are assembled together via the electrolyte, which actually requires the use of two carrier substrates and the running of two series of layer depositions in parallel on each of them).

Whatever the configuration adopted, one requirement with this type of electrochemical system consists in giving it a "memory effect" which is sufficient in terms of the application in question. This term is intended to mean the capacity which the system has to stay in a given state once the electrical power supply has been cut. In the case of an electrochromic window, this state is generally its coloured state. In the absence of an electrical power supply, it tends to revert to its uncoloured state. The aim is clearly for this memory effect to be able to last as long as possible so that, by means of the electrical power supply of the system, the user can actually control its state satisfactorily. In practice, it is for example desirable for the electrochromic window to be able to stay in the coloured state, with the power off, for several hours, for example 10 to 20 hours.

In practice, this goal is difficult to achieve because the system has to deal with a leakage current from one electroconductive layer to the other, in particular at the periphery of the system, which tends to make it revert to its equilibrium state, that is to say to its uncoloured state.

A first solution consisted in accepting the existence of these leakage currents, and in re-supplying the system with electricity when it is in its coloured state, with a given periodicity, in order to compensate for them. It is not, however, fully satisfactory, if only because these leakage currents can vary from one window to another, and in this case the coloration achieved by two similar windows supplied with electricity in the same way is different.

A second solution consisted in putting a margin on one of the two electroconductive layers, that is to say depositing the layers in such a way that they are offset at their periphery, and thus in eliminating/reducing the leakage current from one layer to another at their respective peripheries. The solution is effective but makes the process of manufacturing the system more complicated: in particular, it makes it necessary to deposit at least one of the two electroconductive layers by using a mask on the carrier substrate.

SUMMARY OF THE INVENTION

The object of the invention is therefore to overcome these drawbacks by providing, in particular, a novel method of processing the electrochemical devices described above in order to improve their performance, very particularly in order to limit/eliminate the risks of short-circuits, the so-called leakage currents and, thereby, in order to increase their "memory effect", and to do so while favouring simplicity in its implementation.

The invention firstly relates to a method of processing an electrochemical device having at least one carrier substrate provided with a stack of functional layers comprising at least one electrochemically active layer which is capable of reversibly and simultaneously inserting ions and electrons and which is arranged between two electroconductive layers. It is, in particular, an electrochemical device of the electrochromic type, with a stack of functional layers including at least, successively:

a first electroconductive layer, a first electrochemically active layer capable of reversibly inserting ions, for example cations such as $H^+$, $Li^+$ or anions such as $OH^-$, in particular of an anodic (or cathodic, respectively) electrochromic material, an electrolyte layer, a second electrochromically active layer capable of reversibly inserting the said ions, in particular of a cathodic (or anodic, respectively) electrochromic material, a second electroconductive layer.

The method of the invention is characterized in that the functionality of at least one of the functional layers, with the exception of one of the electroconductive layers, in particular with the exception of the first (the one closest to the carrier substrate), is locally inhibited so as to delimit an inactive peripheral region in the stack.

In the context of the invention, the term "layer" is intended to mean either unitary layers or the superposition of a plurality of layers which jointly fulfil the same function. This is, in particular, the case with the electrolyte layer, which may consist of two or three superposed layers, as disclosed for example by the aforementioned patent EP97/400702.3.

Still in the context of the invention, the stack of layers may also comprise other layers, in particular protective layers, barrier layers, or layers with an optical or bonding function.

The benefit of the invention resides in the simplicity of its implementation, further to its effectiveness. This is because the method allows the layers to be processed once they are (all) deposited in a standardized way, without having to carry out selective deposition of layers, with mask systems or the like in order to obtain a "margin" or an offset, for example. The invention is therefore particularly beneficial in the case of stacks of functional layers containing only layers of solid material: (the "all solid" systems mentioned above).

In the context of the invention, the term "solid" material is intended to mean any material having the mechanical strength of a solid, in particular any material which is essentially inorganic or hybrid, that is to say partially inorganic and partially organic, such as the materials which can be obtained using a process of deposition by sol-gel synthesis.

In fact, in particular in the case of such an all-solid system, all of the layers can be deposited one after the other on the carrier substrate, preferably with the same deposition technique, on the same production line (in particular deposition by magnetic field-assisted sputtering), then all of the stack apart one of the electroconductive layers can be processed according to the invention. Of course, the invention also comprises the alternative variant consisting in stopping the deposition process, and in processing only some of the stack already deposited, then in continuing the deposition of the "missing" layers in order to form the "full" stack. (In the case of a system which is not "all solid", the "missing" layers may be added by assembling the substrate with a second substrate, itself functionalized appropriately).

Keeping one of the electroconductive layers intact, unaffected by the inhibition process according to the invention, makes it possible to ensure correct supply of electricity to the terminals of the device. There are a variety of possible ways of maintaining this integrity for them, and these will be explained below.

The object of this local "inhibition" of the stack of functional layers is to deactivate the device at its periphery, over a border a few millimetres wide, for example, so that in this periphery the system remains permanently in its least ionically and/or electronically conducting state (uncoloured state for most electrochromic systems). This "inactive" border is not in itself disadvantageous because its dimensions can be controlled and it can thus be concealed with ease, if this is deemed necessary from an aesthetic point of view, by the fitting, framing and peripheral-seal system of the device which is always present, very particularly when it is an electrochromic window.

This border actually equates to intentionally cutting the electrical circuit at the periphery of the system, thus eliminating any risk of short-circuit due to the current flowing between the two electroconductive layers. In the extreme, the electrical circuit may be cut by inhibiting only one of the electrochemically active layers exhibiting reversible insertion and/or the electrolyte layer and/or one of the electroconductive layers at their peripheries. However, as mentioned above, it is simpler to process all of the stack apart from the first layer. It should be noted that short-circuits are, in particular, due either to direct contact between the two electroconductive layers, or indirectly via one of the electrochemically active layers when these turn out also to be electronic conductors in one of their states (inserted or uninserted). Thus, tungsten oxide is a better electronic conductor in its coloured state, the same being true of nickel oxide and iridium oxide.

The invention provides two main variants for obtaining this localized-inhibition effect.

The first variant consists in locally inhibiting the functionality of at least one of the layers by cutting it (them) over its (their) thickness(es) along a closed line making it possible to delimit the inactive region of the stack between the said closed line of the edge/side of the stack (assuming all of the stacks, or the majority of them, have similar dimensions and/or are exactly superposed on one another. In fact, the first electroconductive layer usually has slightly larger dimensions than all the others, in order to make it easier to electrically connect it to the second layer, which allows the required connection elements to be placed on its surface which "protrudes" from the stack.

This cut makes it possible to obtain a groove which breaks the circuit as explained above and leaves the periphery of the device unpowered.

Preferably, the cut is made along a closed line which, in smaller proportions, has a profile similar or identical to that of the edge of the stack (or of the edge of the first layer which experiences the cutting, if the underlying layers are of slightly different dimensions, in particular the first as indicated above). This provides an inactive border which "follows" the perimeter of the device and is easy to hide.

Advantageously, the cut is made by some mechanical means, in particular a cutting means, or by laser irradiation. One embodiment consists in leaving the device stationary during the processing and in fitting the mechanical means/laser emitter on a moving part, and another embodiment consists in doing the opposite.

Other means may also be used for making the cut by abrasion. For example, a means emitting a jet of gas or liquid under pressure (nitrogen, air), or a means emitting abrasive particles (glass or corundum beads, shot, solid $CO_2$ beads, etc.).

This cutting operation may be carried out equally well whether the system is in the coloured or uncoloured state. When it is carried out using a laser beam, it may be beneficial to choose a coloured state, in order to increase the laser absorption by the stack at the wavelength used.

The second variant consists in locally inhibiting the functionality of at least one of the layers of the stack (always with the exception of one of the electroconductive layers) by degrading it (them) at its (their) periphery(ies), in particular by a suitable heat treatment or by suitable laser irradiation.

In this figurative case, the degradation is preferably carried out not along a closed line, like the cut according to the first variant, but over the entire surface of the peripheral border which it is desired to "deactivate" thus.

Heat treatment or laser treatment have proved very effective in modifying the layer(s) in question sufficiently in terms of their chemical composition or their structure, in order thus to make them inactive. This is degradation in all likelihood involving, for example, dehydration and/or structural modification (in particular by crystallization) of the layer in question at least partially, without eliminating it.

It is rather beneficial to carry out this degradation treatment on the stack of layers when it is in its uncoloured state: this is because it is in this state that layers of the electrochromic type are least electronically conducting.

It can be seen that irradiation with a laser light can be used either in the context of the first variant, causing actual localized ablation, or in the context of the second variant, doing no more than modifying it. Their accuracy and their effectiveness make lasers particularly beneficial, it then being sufficient to modulate their operating parameters, as will be explained in detail below.

It is thus possible, in the scope of the invention, to make a plurality of closed peripheral cut lines, each closed line having a parameter smaller than the one which is adjacent to it and closer to the edge of the stack than it, and being contained in the "interior" area of the stack delimited by it (the successive closed lines may thus be concentric).

The same is true regarding the variant in which degradation is carried out: it is possible to make not one peripheral degraded region but several, for example concentric ones which may or may not be separated from one another by an unprocessed stack portion.

It should be noted that the two variants described above are alternative or cumulative. It is thus possible, in particular, to make a peripheral cut line and furthermore degrade the region which lies between the said line and the edge of the stack.

Moreover, it is also possible according to the invention to locally inhibit the functionality of at least one of the functional layers, with the exception of one of the electroconductive layers, so as to delimitan "inactive contours" or a non-peripheral "inactive region" in the device.

This inhibition may be carried out using one or other of the two variants explained above, namely either by localized degradation or localized ablation of the layer or layers in question, using the same means, namely heat treatment, laser treatment or some cutting means.

This operation may have two different purposes. It may firstly make it possible to reduce/eliminate non-peripheral short-circuits in the stack when the device is in operation, by deactivating the regions where point defects lead to electrical contacts between the two electroconductive layers, the regions thus rendered inactive being very small and therefore not very or not at all noticeable. In order to make these regions even less noticeable, arrangements may be made, once the regions have been processed, to colour them permanently using an ink jet of a dark colour close to that of the system in the coloured state. The "corrected" regions are therefore completely masked when the system is in the coloured state (the state in which points remaining bright would be most noticeable). It is thus possible easily and effectively to correct the point defects of the system.

This operation may also make it possible to draw patterns in the device, these patterns appearing only when the system is in its coloured state. It is thus possible, according to the way in which the degradation or ablation is carried out, to obtain patterns which are "solid" or delimited by contours as desired.

It has been seen above that the preferred embodiment of the invention consisted in the processing method affecting all of the functional layers apart from the (first) electroconductive layer. In order to preserve the latter's integrity, its deposition parameters may advantageously be selected in order to make it more resistant, harder and denser than the other layers and, in particular, than the other electroconductive layer. The characteristics of the layer are thus modulated in combination with those of the means used for the processing so that the layer is not modified.

If this layer is, for example, deposited by magnetic field-assisted sputtering, it is possible, in a known way, to modulate its density by varying the pressure in the deposition chamber, the deposition temperature, etc.

It is thus possible to vary the deposition techniques used. For example, the layer which it is desired to preserve may be deposited by a hot deposition technique of the pyrolysis type (in the solid, liquid or gas CVD phase), well-suited to obtaining doped metal oxide layers and known to make it possible to obtain particularly hard and resistant layers, and depositing some or all of the other layers by a deposition technique which does not generally make it possible to achieve such high hardnesses, such as a vacuum deposition technique (sputtering, evaporation).

The invention also relates to the electrochemical device of the electrochromic type processed using the method described above, which has at least one peripheral inactive region remaining permanently in the uncoloured state, in particular in the form of a margin with a width of, for example, at most 5 mm.

The device processed according to the invention preferably has, during operation (in the coloured state), a leakage current (total leakage current per unit length of the perimeter) less than or equal to 20 $\mu$A/cm, in particular less than or equal to 10 $\mu$A/cm or 5 $\mu$A/cm.

BRIEF DESCRIPTION OF THE DRAWINGS

Other details and advantageous characteristics of the invention will be found in the following description of a nonlimiting embodiment with reference to the appended drawing, in which.

Figure 1:
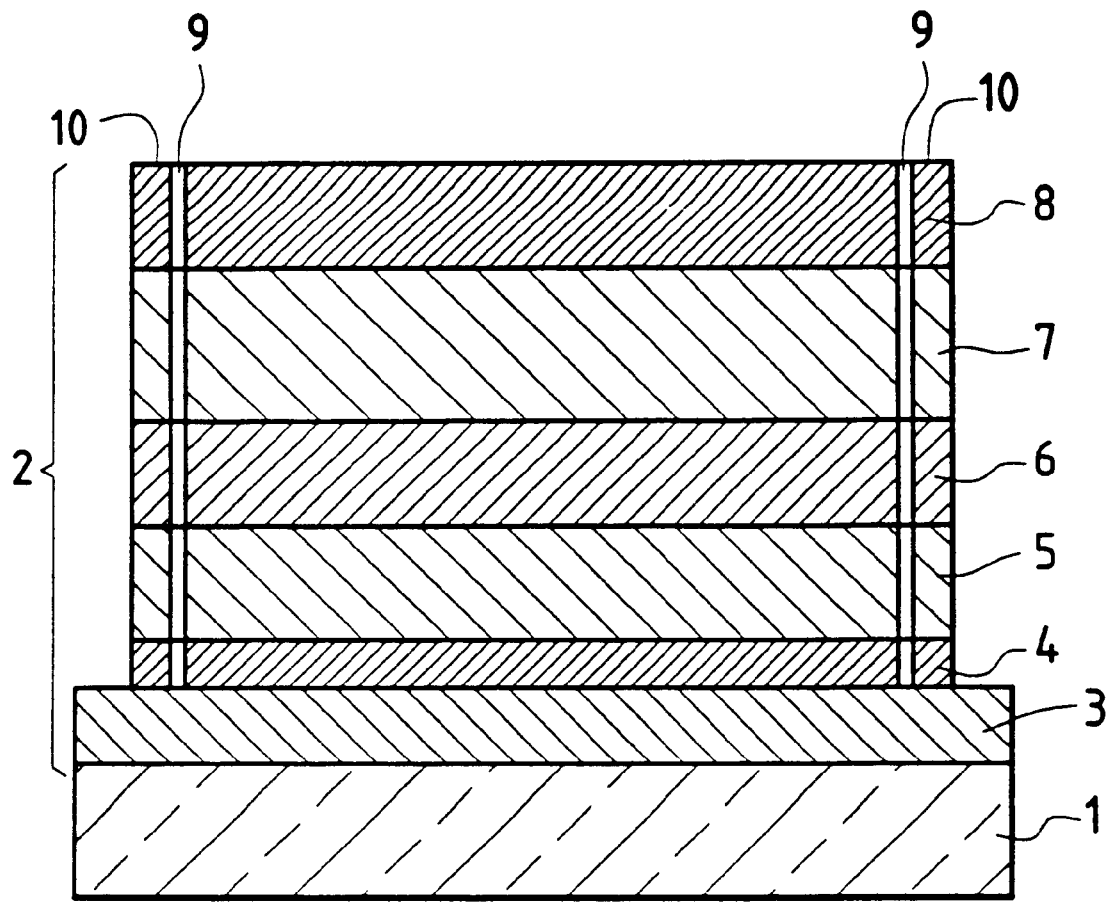
FIG. 1: represents an electrochromic window in section.

This figure is extremely schematic and does not respect the proportions between the various elements represented, this being in order to make it more readable. In particular, all the electrical connections known per se are furthermore not represented.

DETAILED DESCRIPTION OF PREFERRED EMBODIMENT

The example described below relates to an electrochromic window of the "all solid" type according to the teaching of patents EP97/400702.3 and EP-0,831,360 which were mentioned above. The invention is not, however, limited to such a configuration.

Thus, as mentioned above, the invention can be applied to any type of electrochemical systems, in particular electrocontrollable windows of the electrochromic window type. It is preferably in the form of a stack of functional layers comprising, in succession, a preferably transparent electroconductive layer, a so-called cathodic electrochromic layer capable of reversibly inserting ions such as $H^+$, $Li^+$, $Na^-$, Ag$^+$ or OH$^-$, an electrolyte layer, optionally a back electrode in the form of a second so-called anodic electrochromic layer, also capable of reversibly inserting the said ions, and lastly a second electroconductive layer.

As regards the nature of the electroconductive layers of the device, there are two possible variants: materials based on doped metal oxide, such as fluorine-doped tin oxide SnO$_2$:F or tin-doped indium oxide ITO may be employed. It is also possible to use layers of metal or metal alloy, for example from gold Au, silver Ag or aluminium Al. Since the device generally has two electroconductive layers, they may either both be metallic or both be based on doped oxide, or one based on metal and the other based on doped oxide. They may furthermore be made up of superposed conductive layers, for example at least one metallic layer combined with a doped metal oxide layer.

In order to form the layer of cathodic electrochromic material, a material or a mixture of materials which is or are chosen from the group comprising tungsten oxide WO$_3$, molybdenum oxide MoO$_3$, vanadium oxide V$_2$O$_5$, niobium oxide Nb$_2$O$_5$, titanium oxide TiO$_2$, a "cermet" material (combination of metallic material and ceramic, in particular in the form of metal particles in a ceramic matrix) such as WO$_3$/Au or WO$_3$/Ag, a mixture of tungsten and rhenium oxides WO$_3$/ReO$_3$ may be chosen. These materials are suitable, in particular, in the case of reversible insertion of lithium ions. In the case when the device operates by reversible insertion of protons, the same materials may be used, but this time hydrated.

In order to form the layer of anodic electrochromic material, a material which corresponds to the formula M$_x$A$_y$U$_z$, with M a transition metal, A the ion used for the reversible insertion, for example an alkali metal or a proton, and U a chalcogen such as oxygen or sulphur, may be chosen.

It may be, particularly in the case of inserting proton ions H$^+$, a compound or a mixture of compounds belonging to the group comprising LiNiO$_x$, IrO$_x$H$_y$, IrO$_x$H$_y$N$_z$, NiO$_x$, NiO$_x$H$_y$N$_z$, RhO$_x$, CoO$_x$, MnO$_x$, RuO$_x$. In the case of reversible insertion of lithium ions Li$^+$, a compound or a mixture of compounds belonging to the group comprising LiNiO$_x$, LiMn$_2$O$_4$, IrO$_x$, Li$_x$IrO$_y$, Li$_x$S$_n$O$_y$, NiO$_x$, CeO$_x$, TiO$_x$, CeO$_x$—TiO$_x$, RhO$_x$, CoO$_x$, CrO$_x$, MnO$_x$ will rather be chosen.

As regards the choice of the electrolyte material, there are in fact two types of it as mentioned above.

In the context of the invention, electrolytes in the form of solid material are favoured, in particular based on metal oxide, preferably comprising a layer of an ionic conductor material which is capable of reversibly inserting the ions but whose degree of oxidation is kept essentially constant, such as a material with electrochromic properties of the WO$_3$ type, as described in patent EP97/400702.3. The invention does, however, include the other types of electrolyte (polymer, gel, etc.).

The functional system of the element according to the invention may therefore be arranged either between two substrates or on a single substrate, more particularly in the case of an "all solid" system. The rigid carrier substrates are preferably made of glass, acrylic or allylic polymer, polycarbonate or certain polyurethanes. The carrier substrates may also be supple and flexible and intended to be laminated to rigid substrates, and this may involve flexible polycarbonate, polyethylene terephthalate (PET) etc. The lamination may be carried out with intermediate polymer sheets of the thermoplastic type such as polyvinylbutyral (PVB), ethylene vinyl acetate (EVA) or certain polyurethanes.

These windows may thus have a "monolithic" structure, that is to say with a single rigid substrate, or with a plurality of rigid substrates, have a laminated and/or multi-pane structure, or alternatively a so-called asymmetric window structure with an outer plastic layer, in particular based on polyurethane with energy-absorption properties, which structure is in particular described in patents EP-191,666, EP-190,953, EP-241,337, EP-344,045, EP-402,212, EP-430,769 and EP-676,757.

Let us now return to the specific example of an electrochromic window processed according to the invention, which is represented in FIG. 1.

All the layers are based on metal oxide(s) and are deposited by magnetic field-assisted reactive DC sputtering (in an Ar/O$_2$ or Ar/H$_2$/O$_2$ atmosphere from suitable metal targets).

FIG. 1 represents a clear silica-soda-lime glass substrate 1 with an area of 1000 cm$^2$ and a thickness of 3 mm, on top of which there is the "all solid" electrochromic system made up of the following layer stack 2:

a first tin-doped indium oxide ITO electroconductive layer 3 with a thickness of 150 nm, a first layer 4 of anodic electrochromic material, made of hydrated iridium oxide H$_x$IrO$_y$ with a thickness of 37 nm, an electrolyte bi-layer made up of a tungsten oxide WO$_3$ layer 5 with a thickness of 200 nm then a 200 nm tantalum oxide layer 6, a second layer 7 of cathodic electrochromic material, made of hydrated tungsten oxide H$_x$WO$_3$ with a thickness of 380 nm, a second ITO electroconductive layer 8 with a thickness of 280 nm.

The electroconductive layer 3 was deposited with different deposition conditions from those used for the other electroconductive layer 8, so that the first is significantly denser and harder than the second which, by comparison, appears more "porous". This guarantees that the first layer will not be affected by the processing according to the invention.

One variant consists in slightly modifying the thicknesses of the example described above, using a 100 nm WO$_3$ layer 5, a 100 nm tantalum oxide layer 6, a 280 nm H$_x$WO$_3$ layer 7 and finally a 270 nm ITO layer 8.

Twelve identical specimens were made in this way, in order to make it possible to evaluate statistically the effectiveness of the processing according to the invention, which consisted in making a groove/cut on all the layers except for the first, using a suitable laser beam.

The types of laser which can be used to make this cut (as well as, alternatively, to carry out controlled degradation without ablation) are in particular of the pulsed EXCIMER laser type (using KrF with a wavelength of 248 nm, TeCl with a wavelength of 308 nm, ArF with a wavelength of 193 nm, XeF with a wavelength of 351 nm or F2 with a wavelength of 157 nm), or a DC diode laser (wavelength 532, 510, 578or 808 nm) or a "YAG" (yttrium aluminium garnet Y$_3$Al$_5$O$_{12}$ crystal) laser with a wavelength of 1 $\mu$m, or a CO$_2$ laser with a wavelength of 9.3 and 10.6 $\mu$m. The choice of the laser depends, in particular, on the absorption spectrum of the stack of layers. In order to control it appropriately (in particular in order to choose between actual ablation or only degradation of the layer(s) in question, a variety of parameters need to be adjusted and taken into account, in particular the fluence on the substrate (in J/cm$^2$), the frequency of the laser (in Hz), the speed at which the laser emitter moves relative to the substrate (mm/s), the number of pulses received at a point on the layer, and the width of the cut (in mm).

In the present case, a KrF EXCIMER laser was used, with a laser beam having an energy density of 0.12 J/cm², fitted on a part moving over the stack so as to make a groove 9 which has a width of about 100 μm and which follows the contour of the stack 2 at a distance of about 2 mm from its edge, that is to say a substantially square groove. The term contour of the stack is intended here to mean that of all the functional layers apart from the first, which has slightly larger dimensions in order to make it easier to fit the connection elements, in a known way.

It was then observed, once the stack had been processed in this way and the electrical connections had been made, that the peripheral short-circuits encountered in the coloured state are of extremely low level and are extremely reproducible from one specimen to another (it should be noted that this assessment is made with reference to the coloured state of the electrochromic system, because this is the most unfavourable one: the reason for this is that, in this case, the active electrochromic layers made of iridium oxide, 4, and of $H_xWO_3$, 7, are good ionic, and also good electronic, conductors).

The leakage currents measured are thus on average 4 μA/cm, while identical specimens which were not processed have leakage currents of the order of 300 to 400 μA/cm. (These comparative specimens, which are not processed according to the invention, are provided with margins so that the two electroconductive layers are offset relative to one another: before deposition, the edges are masked with 50 to 100 μm-thick adhesive tape, which is removed after deposition in order to take the measurements).

Tests were then carried out in order to assess the effect of this substantial elimination of the peripheral leakage currents on the memory effect of the system.

In the uncoloured state (reference), its optical transmission $T_L$ (based on the $D_{65}$ illuminant) is 65%. In the maximum-coloured state (reference), its $T_L$ is 13.2%.

Once it has been put in its covered state by applying an appropriate voltage, the electrical circuit is open:

after 2 hours, the $T_L$ is 14.5%, after 17 hours, the $T_L$ is 20.5%, after 27 hours, the $T_L$ is 23.6%

(test carried out on 12 specimens, the values of $T_L$ being averaged).

This means that, after a full day, the system is still significantly coloured, with a great improvement over unprocessed systems.

It should be clear that the device on which the laser processing has been carried out, which is represented in FIG. 1, is generally "incomplete" insofar as it generally needs to be provided with a means of protection on top of the stack 2, for example by laminating it with glass or a flexible substrate such as PET, to produce a double-glazing assembly in which the stack faces the intermediate gas layer and may optionally be provided with a protective film. The stack may also be encapsulated with a leaktight polymer/varnish such as a polyurethane or epoxy varnish, or a polyparaxylylene film, or an inorganic layer such as $SiO_2$ or $Si_3N_4$, or any other inorganic or organo-mineral layer obtained, in particular, by a sol-gel process.

The 2 mm uncoloured band 10 on the perimeter of the stack which is due to the laser processing is easy to conceal when fitting the window.

The method according to the invention is therefore efficient and avoids having to interrupt the sequence of layer deposition for forming the stack.

What is claimed is:

1. An electrochemical device having at least one carrier substrate in contact with a stack of functional layers comprising two electroconductive layers and at least one electrochemically active layer, which is capable of reversibly and simultaneously inserting ions and which is arranged between the two electroconductive layers, wherein at least one of the functional layers, with the exception of one of the two electroconductive layers, comprises an active region, and a deactivated peripheral region, where the active region is surrounded by the deactivated peripheral region; and the deactivated peripheral region has a higher electrical resistivity than the active region.

2. The device according to claim 1, wherein the deactivated peripheral region of the at least one of the functional layers is electrically isolated from the active region.

3. The device according to claim 2, wherein the device further comprises a groove; and the groove separates the active region of the at least one of the functional layers from the deactivated peripheral region.

4. The device according to claim 1, wherein the deactivated peripheral region comprises a structurally modified portion of the at least one of the functional layers.

5. The device according to claim 4, wherein the structurally modified portion of the at least one of the functional layers comprises a dehydrated or crystallized portion of the at least one of the functional layers.

6. The device according to claim 4, wherein the structurally modified portion of the at least one of the functional layers is produced by heating or laser irradiating the at least one of the functional layers.

7. The device according to claim 1, wherein the stack comprises at least, successively, a first electroconductive layer, an electrochemically active layer capable of reversibly inserting ions in an anodic or cathodic electrochromic material, an electrolyte layer, a second electrochemically active layer capable of reversibly inserting the ions in the cathodic or anodic electrochromic material, and a second electroconductive layer.

8. The device according to claim 1, wherein the stack of functional layers contains only layers of solid material.

9. The device according to claim 1, wherein the two electroconductive layers include a first electroconductive layer more resistant, harder and/or denser than the functional layers; and each of the functional layers, apart from the first electroconductive layer, includes a different active region surrounded by a different deactivated peripheral region.

10. The device according to claim 1, wherein the device has at least one peripheral inactive region remaining permanently in an uncolored state.

11. The device according to claim 1, wherein during operation the device has a leakage current less than or equal to 20 μA/cm.

12. An electrochemical device having at least one carrier substrate in contact with a stack of functional layers comprising two electroconductive layers and at least one electrochemically active layer, which is capable of reversibly and simultaneously inserting ions and which is arranged between the two electroconductive layers, wherein at least one of the functional layers, with the exception of one of the two electroconductive layers, comprises at least one deactivated non-peripheral region surrounded by an active region.

13. The device according to claim 12, wherein the deactivated non-peripheral region of the at least one of the functional layers is electrically isolated from the active region.

14. The device according to claim 12, wherein the deactivated non-peripheral region has a higher electrical resistivity than the active region.

15. The device according to claim 14, wherein the deactivated peripheral region comprises a structurally modified portion of the at least one of the functional layers.

16. The device according to claim 15, wherein the structurally modified portion of the at least one of the functional layers comprises a dehydrated or crystallized portion of the at least one of the functional layers.

17. The device according to claim 15, wherein the structurally modified portion of the at least one of the functional layers is produced by heating or laser irradiating the at least one of the functional layers.

18. The device according to claim 12, wherein the deactivated non-peripheral region forms a pattern in the device.

19. The device according to claim 12, wherein the two electroconductive layers include a first electroconductive layer more resistant, harder and/or denser than the functional layers; and each of the functional layers, apart from the first electroconductive layer, includes a different deactivated non-peripheral region surrounded by a different active region.

20. An electrochemical device having at least one carrier substrate in contact with a stack of functional layers comprising two electroconductive layers and at least one electrochemically active layer, which is capable of reversibly and simultaneously inserting ions and which is arranged between the two electroconductive layers, wherein a first at least one of the functional layers, excluding one of the two electroconductive layers, comprises a first active region surrounded by a first deactivated peripheral region; and a second at least one of the functional layers, excluding the one of the two electroconductive layers, comprises at least one second deactivated non-peripheral region surrounded by a second active region.

21. The device according to claim 20, wherein the first deactivated peripheral region is electrically isolated from the first active region; and the at least one second deactivated non-peripheral region is electrically isolated from the second active region.

22. The device according to claim 20, wherein the first deactivated peripheral region has a higher electrical resistivity than the first active region; and the second deactivated non-peripheral region has a higher electrical resistivity than the second active region.

23. The device according to claim 20, wherein the two electroconductive layers include a first electroconductive layer more resistant, harder and/or denser than the other functional layers; and each of the functional layers, apart from the first electroconductive layer, includes a different active region surrounding a different deactivated non-peripheral region and surrounded by a different deactivated peripheral region.

24. An electrochemical device processed using the method of claim 20, wherein during operation the device has a leakage current less than or equal to 20 $\mu$A/cm.

* * * * *

UNITED STATES PATENT AND TRADEMARK OFFICE
CERTIFICATE OF CORRECTION

PATENT NO.    : 6,529,308 B2  
DATED         : March 4, 2003  
INVENTOR(S)   : Beteille et al.

Page 1 of 1

It is certified that error appears in the above-identified patent and that said Letters Patent is hereby corrected as shown below:

<u>Title page,</u>  
Item [30], the Foreign Application Priority Data should be deleted since no Priority is being claimed.

Signed and Sealed this

Fifth Day of August, 2003

JAMES E. ROGAN  
*Director of the United States Patent and Trademark Office*